Aug. 30, 1938.  R. E. LUMPKIN  2,128,371

DISH

Filed July 24, 1937

Inventor
Ray E. Lumpkin.

By Lacey & Lacey, Attorneys

Patented Aug. 30, 1938

2,128,371

UNITED STATES PATENT OFFICE 2,128,371

DISH

Ray E. Lumpkin, San Antonio, Tex., assignor to L. W. Fowler

Application July 24, 1937, Serial No. 155,526

2 Claims. (Cl. 65—15)

This invention relates to dishes and more particularly to a dish or bowl in which half a grapefruit is to be served.

One object of the invention is to provide a dish which is of a bowl-like construction and so formed that a half a grapefruit may be served in the dish and surrounded by ice which will keep the grapefruit chilled.

Another object of the invention is to so construct the dish that, when the ice surrounding the grapefruit melts, resulting water may drain into the lower portion of the fruit receiving pocket or chamber of the dish where it will assist in maintaining the fruit chilled and also be prevented from being spilled.

Another object of the invention is to so form the dish that, when a half a grapefruit or orange is placed in the dish, a pin may be passed through the fruit and thus serve to prevent the half a grapefruit from tilting out of its proper position while at the same time allowing it to be turned as sectors of the fruit are dug out of the rind with a spoon.

Another object of the invention is to so form the dish that, when it is in use, it will be firmly supported and prevented from being accidentally tilted over as the pulp is spooned out of the rind.

The invention is illustrated in the accompanying drawing, wherein

Figure 1:
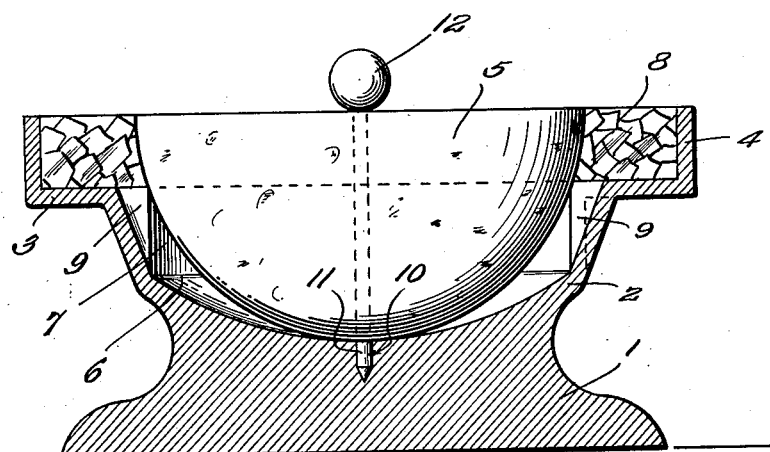
Figure 2:
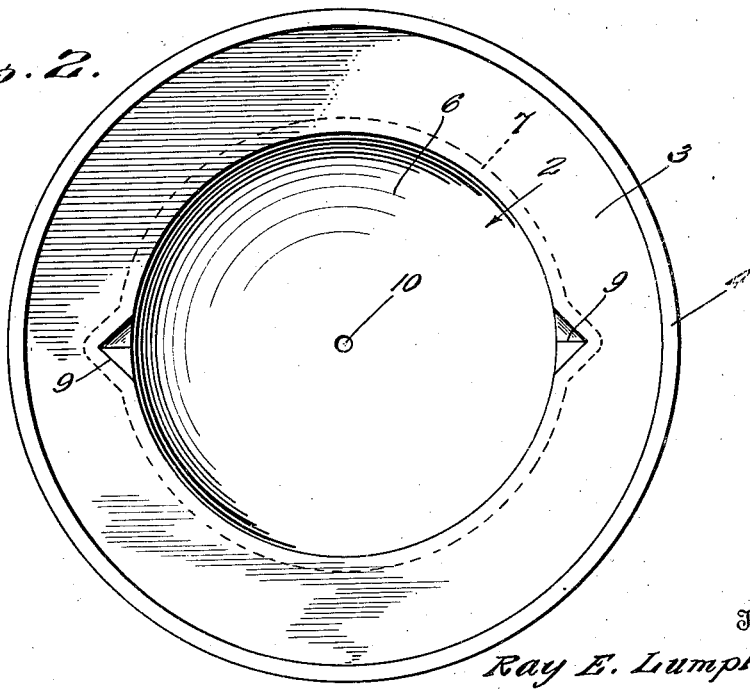

Figure 1 is a sectional view taken transversely through the dish and showing a half a grapefruit mounted therein, and Figure 2 is a top plan view of the dish.

This improved dish may be formed of glass, metal or any other desired material and has a solid base 1 supporting a bowl 2. The bowl is substantially hemispherical in shape and about its upper portion is formed with an outstanding circumferential ledge 3 formed at its outer periphery with an upstanding annular flange 4. It will thus be seen that, when a grapefruit 5 which has been cut in half is placed in the bowl, it will be seated in a chamber 6 of such depth that the upper surface of the fruit will be substantially flush with the plane of the upper edge face of the flange 4. While it has been stated that the bowl 2 is substantially hemispherical in shape, it will be noted that the walls 7 thereof extend in a vertical plane from the concave bottom of the chamber 6. Therefore, when the half a grapefruit is placed in the chamber 6 with portions resting upon the bottom of the chamber and other portions resting at the intersection of the ledge 3 with the upper edge of the wall 7, a space will be provided about the grapefruit within the chamber to receive water resulting when ice 8 upon the ledge or shelf melts. Portions of the annular wall 7 of the chamber are extended outwardly, as shown at 9, to form gutters or spouts which are spaced from each other circumferentially of the chamber and serve as passages through which the water formed by the melted ice may flow into the chamber. This water accumulates in the chamber about the grapefruit and assists in chilling the fruit as well as preventing an accumulation of water in the ice-receiving pocket defined by the shelf and its upstanding flange. It will thus be seen that the water will not be liable to be spilled. A socket 10 is formed centrally of the bottom of the chamber 6 and extends vertically so that, when a half a grapefruit is placed in the dish, a pin 11 may be passed downwardly through the center of the grapefruit and its lower end engaged in the socket. A head 12 is provided at the upper end of the pin in order that the pin may be easily driven through the grapefruit and also serve as a hand-hold by means of which the pin may be grasped while turning the half a grapefruit about the pin as pulp is spooned out of the rind.

In the preferred embodiment of the invention, the head 12 which is of spherical formation is colored red so that this head resembles a cherry placed at the center of the half a grapefruit and imparts an attractive appearance to the fruit. While it has been stated that the pin is to be grasped by its head while removing the pulp from the grapefruit, the pin may be removed before eating the fruit.

Having thus described the invention, what is claimed as new is:

1. A dish of the character described comprising a base, a bowl formed integral with the base and extending upwardly from the upper end thereof, and an outstanding shelf surrounding said bowl at the upper end thereof and formed with an upstanding flange about its outer periphery, portions of walls of the bowl being projected outwardly to provide internal channels counter-sunk with respect to the inner surface of the bowl and leading from the shelf into the bowl and constituting means through which water may flow from the shelf into the bowl.

2. A dish of the character described comprising a base, a bowl formed integral with the base and extending upwardly from the upper end thereof, an outstanding shelf surrounding said bowl at the upper end thereof and formed with an upstanding flange about its outer periphery, portions of walls of the bowl being projected outwardly to provide internal channels countersunk with respect to the inner surface of the bowl and leading from the shelf into the bowl and constituting means through which water may flow from the shelf into the bowl, and a socket leading from the bottom of the bowl at the center thereof and extending downwardly therefrom to receive an anchoring pin of a length adapting it to be passed vertically through the center of a halved fruit placed in the bowl with the lower end of the pin engaged in the socket.

RAY E. LUMPKIN.